(12) United States Patent
Moghaddam

(10) Patent No.: US 8,638,012 B2
(45) Date of Patent: Jan. 28, 2014

(54) ROTOR FOR A SYNCHRONOUS RELUCTANCE MACHINE

(75) Inventor: Reza Rajabi Moghaddam, Vasteras (SE)

(73) Assignee: ABB Research Ltd. (CH)

( * ) Notice: Subject to any disclaimer, the term of this patent is extended or adjusted under 35 U.S.C. 154(b) by 58 days.

(21) Appl. No.: 13/230,543

(22) Filed: Sep. 12, 2011

(65) Prior Publication Data

US 2012/0062053 A1 Mar. 15, 2012

Related U.S. Application Data

(63) Continuation of application No. PCT/EP2009/052930, filed on Mar. 12, 2009.

(51) Int. Cl.
*H02K 19/02* (2006.01)
(52) U.S. Cl.
USPC ............... 310/46; 310/216.057; 310/216.112
(58) Field of Classification Search
USPC .................. 310/216.057, 216.064, 216.074, 310/216.075, 216.091, 216.112, 46
See application file for complete search history.

(56) References Cited

U.S. PATENT DOCUMENTS

| | | | | |
|---|---|---|---|---|
| 5,418,415 | A | * | 5/1995 | Ishizaki ..................... 310/162 |
| 5,818,140 | A | * | 10/1998 | Vagati ......................... 310/185 |
| 6,239,526 | B1 | | 5/2001 | Oh et al. |

FOREIGN PATENT DOCUMENTS

| | | |
|---|---|---|
| DE | 10004175 A1 | 4/2001 |
| JP | 2001095182 A | 4/2001 |
| JP | 2001103719 A | 4/2001 |
| JP | 2001136717 A | 5/2001 |
| JP | 2001258222 A | 9/2001 |

OTHER PUBLICATIONS

International Preliminary Report on Patentability; Application No. PCT/EP2009/052930; Issued: Jun. 20, 2011; 10 pages.
International Search Report and Written Opinion of the International Searching Authority; Application No. PCT/EP2009/052930; Issued: Dec. 15, 2009; 18 pages.

* cited by examiner

*Primary Examiner* — Tran Nguyen
*Assistant Examiner* — Naishadh Desai
(74) *Attorney, Agent, or Firm* — St. Onge Steward Johnston & Reens LLC

(57) ABSTRACT

A rotor for a synchronous reluctance machine wherein a torque ripple behaviour of the machine is optimized by altering the geometry of insulating barriers of the rotor. A q-axis pitch angle is used as a design variable instead of setting its value equal to the rest of the rotor slot pitches or binding its value to the stator slot pitch. The resulting rotor has a non-regular slot pitch across the q-axis and substantially regular slot pitch otherwise. Synchronous reluctance machines that employ rotor discs and rotor assemblies in accordance with the present invention may exhibit low torque ripple without sacrificing high torque values.

5 Claims, 5 Drawing Sheets

ROTOR FOR A SYNCHRONOUS RELUCTANCE MACHINE

CROSS-REFERENCE TO RELATED APPLICATIONS

The present application is a continuation of pending International patent application PCT/EP2009/052930 filed on Mar. 12, 2009 which designates the United States, the content of which is incorporated herein by reference.

FIELD OF THE INVENTION

The present invention relates to a rotor for a synchronous reluctance machine, especially the geometry of the insulating barriers of the rotor and the geometry's effect on the torque ripple behaviour of the machine. The present invention further relates to a method of designing a rotor for a synchronous reluctance machine.

BACKGROUND OF THE INVENTION

Synchronous reluctance machines known in the art typically comprise stators with poly-phase windings forming a plurality of poles in a manner resembling the stator of an induction motor. The rotor assembly of the synchronous reluctance machine does normally not include electrical windings but has a number of poles in form of magnetically permeable segments. The rotor assembly is formed as an anisotropic structure where each pole of the reluctance machine has a direction of minimum reluctance, a so-called direct axis or d-axis, and a direction of maximum reluctance, a so-called quadrature axis or q-axis. When sinusoidal currents are applied to the poly-phase windings in the stator, an approximately sinusoidal magnetic flux waveform is produced in an air gap formed between the stator poles and an outer contour of the rotor assembly. The rotor will attempt to align its most magnetically permeable direction, the d-axis, to the direction of the peak flux by displacing its d-axis of minimum reluctance until alignment of the magnetic fields in the stator poles and rotor poles is obtained. The alignment process results in rotary motion of the rotor assembly at the same speed as the rotating stator magnetic field, i.e. at synchronous speed. The rotary motion of the rotor generates a torque which can be conveyed to the exterior of the reluctance machine for example by a rotor shaft bonded to the rotor assembly and extending through a central axis thereof.

According to FIG. 1 the rotors 30 are given an anisotropic structure by alternating layers of magnetically permeable segments 3 and magnetically insulating barriers 4. The rotor assembly may comprise a stack of transversally oriented rotor laminations or axially oriented rotor laminations. In the case of transversally oriented laminations shown in FIG. 1 the rotor 30 essentially consists of a stack of thin rotor discs 1 wherein the insulating barriers 4 are created by cutting material in shape of longitudinal slots. It is thereby the air inside the cut-outs that functions as the insulating barrier 4. The disc structures are typically designed to be mechanically self-sustained, the magnetically permeable segments 3 being connected by narrow tangential ribs 16 at the periphery of the discs. Radial ribs 17 close to the middle of the segments are known in order to improve the mechanical strength of the discs. In the case of axially oriented laminations the insulating barriers 4 are made of some solid insulating material and the insulating barriers 4 reach the air gap between the rotor 30 and the stator.

An important parameter of the rotor is a rotor slot pitch which can be defined as the distance between two adjacent insulating layers measured at the air gap between the rotor and the stator. Rotor assemblies have conventionally been designed with an equal rotor slot pitch i.e. all rotor slot pitches being of equal distance, and an equal stator slot pitch, in order to minimize the torque ripple and to provide a reasonable torque. Another conventional practice has been to set the rotor slot pitch equal to the stator slot pitch.

U.S. Pat. No. 5,818,140 discloses a rotor assembly for a synchronous reluctance motor, the structure of the transversely laminated rotor assembly being aimed at minimizing its torque ripple. The disclosed rotor design and the accompanying design formula require an equal rotor slot pitch and an equal stator slot pitch around the respective perimeters of these components.

U.S. Pat. No. 6,239,526 discloses a rotor assembly for a synchronous reluctance motor, wherein the insulating barriers of the rotor are slanted toward the q-axis. The rotor slot pitch has thereby been rendered non-equal across both q-axis and d-axis, the aim being to minimize the torque ripple by dimensioning the insulating barriers such that while one end faces a centre of a slot of the stator, the other end faces a centre of a tooth of the stator. This disclosure assumes that the rotor slot pitch between the q-axis and the d-axis of each pole is equal to the stator slot pitch.

However, despite the measures taken to decrease the torque ripple, rotors designed according to the conventional design principles still exhibit a high torque ripple.

SUMMARY OF THE INVENTION

One object of the invention is to provide a rotor for a synchronous reluctance machine, which rotor causes the machine to exhibit a low torque ripple. It is a further object of the invention to provide a method of designing a rotor for a synchronous reluctance machine to obtain a machine exhibiting low torque ripple.

These objects are achieved by the rotor according to claim 1.

According to a first aspect of the invention, there is provided a rotor for a synchronous reluctance machine, a cross-section of the rotor comprising: a plurality of pole sectors, each pole sector comprising a plurality of insulating barriers, each insulating barrier extending between two pitch points, a plurality of q-axes, each q-axis defining a direction of maximum reluctance of the corresponding pole sector, a perimeter defining the outer contour of the cross-section, a plurality of reference points located on the perimeter symmetrically with regard to the q-axes, the angular intervals between the reference points defining reference angles which between two neighbouring q-axes have an equal value of $\alpha_m = \gamma/(k-1)$, where $\gamma$ is an angle between two pitch points that are furthest apart between two neighbouring q-axes and k is the number of pitch points between two neighbouring q-axes, a q-axis pitch angle defined by an angular distance $\delta$ between two neighbouring pitch points on opposite sides of a q-axis, the q-axis pitch angle having a value which is different from $\delta = 3 \ast \alpha_m$, the angular positions of each pitch point and the reference point closest to that pitch point have a deviation having a value $\Delta_T$ less than 3 degrees.

By using the rotor slot pitch across the q-axis (q-axis pitch angle) as a design variable instead of setting its value equal to the rest of the rotor slot pitches or binding its value to the stator slot pitch, an increased design freedom compared to the prior art solutions is achieved which enables the optimization of the torque ripple behaviour of the machine. The present inventors have both experimentally and by finite element method (FEM) simulations demonstrated that selecting a δ value that is different from $3*\alpha_m$ has a significant impact on important performance measures of the rotor disc, in particular the torque ripple. Although it may be difficult to analytically derive the optimal δ value, as soon as all the design variables of a simulating model are set, the optimal q-axis pitch angle 12 can easily be found in a small number of iteration steps.

The angular positions of the pitch points and the closest reference points may have a deviation having a value $\Delta_T$ less than 2.5 degrees, such as less than 2 degrees, such as less than 1 degree. Whereas the reference points are representing the optimal angular positions of the pitch points, satisfactory torque ripple behaviour can be achieved even when the angular positions of the pitch points and the corresponding reference point have a small deviation.

The q-axis pitch angles may differ from $\delta=3*\alpha_m$ by at least 1 degree, such as at least 2, 3, 5 or 10 degrees.

The rotor may comprise a radial rib across an insulating barrier for improving the mechanical strength of the rotor.

The rotor may comprise a cut-off at the rotor perimeter on a q-axis. By providing a rotor disc with an insulating barrier in form of a cut-off at the rotor perimeter the magnetic flux at this outermost radial portion is disabled.

According to a second aspect of the invention, a method of designing a rotor for a synchronous reluctance machine is provided, the method comprising: a) providing a basic geometry of the rotor, the basic geometry comprising: a plurality of pole sectors, each pole sector comprising a plurality of insulating barriers, each insulating barrier extending between two pitch points, a plurality of q-axes, each q-axis defining a direction of maximum reluctance of the corresponding pole sector, a plurality of reference points located on the perimeter symmetrically with regard to the q-axes, the angular intervals between the reference points defining reference angles which between two neighbouring q-axes have an equal value of $\alpha_m=\gamma/(k-1)$, where γ is an angle between two pitch points that are furthest apart between two neighbouring q-axes and k is the number of pitch points between two neighbouring q-axes, b) providing a simulation model of the rotor, the simulation model comprising a plurality of design parameters, one of the design parameters being q-axis pitch angle defined by an angular distance δ between two neighbouring pitch points on opposite sides of a q-axis, c) executing a simulation with at least two different δ values, d) determining the q-axis pitch angle value on the basis of the simulation results.

A simulation model is necessary in order to effectively take advantage of the present invention. When a simulation model comprising a parameter δ for the q-axis pitch angle once is created, it is easy to execute simulations with different δ values in order to find an optimum value.

The simulation model may be configured to return a value corresponding to the torque ripple. δ is increased and/or decreased until at least one local minimum of the value corresponding to the torque ripple is found, and the q-axis pitch angle value is determined to correspond to the local minimum of the torque ripple. It is relatively easy to find out the behaviour of the torque ripple curve by a small number of simulations with discrete δ values, and it is logical to give the q-axis pitch angle a value δ that results in a minimum torque ripple.

The initial value of the q-axis pitch angle may be chosen to be $\delta=3*\alpha_m$. Although the initial q-axis pitch angle value can be chosen arbitrarily, choosing $\delta=3*\alpha_m$ is a good starting point and gives an idea how the torque ripple behaviour is improved compared to the prior art solutions.

BRIEF DESCRIPTION OF THE DRAWINGS

The invention will be explained in greater detail with reference to the accompanying drawings, wherein FIGS. 5a-5c show a simulated torque/torque ripple curve for a certain rotor disc as a function of the q-axis pitch angle, and a corresponding change in the rotor disc geometry.

DETAILED DESCRIPTION OF THE INVENTION

Figure 1:
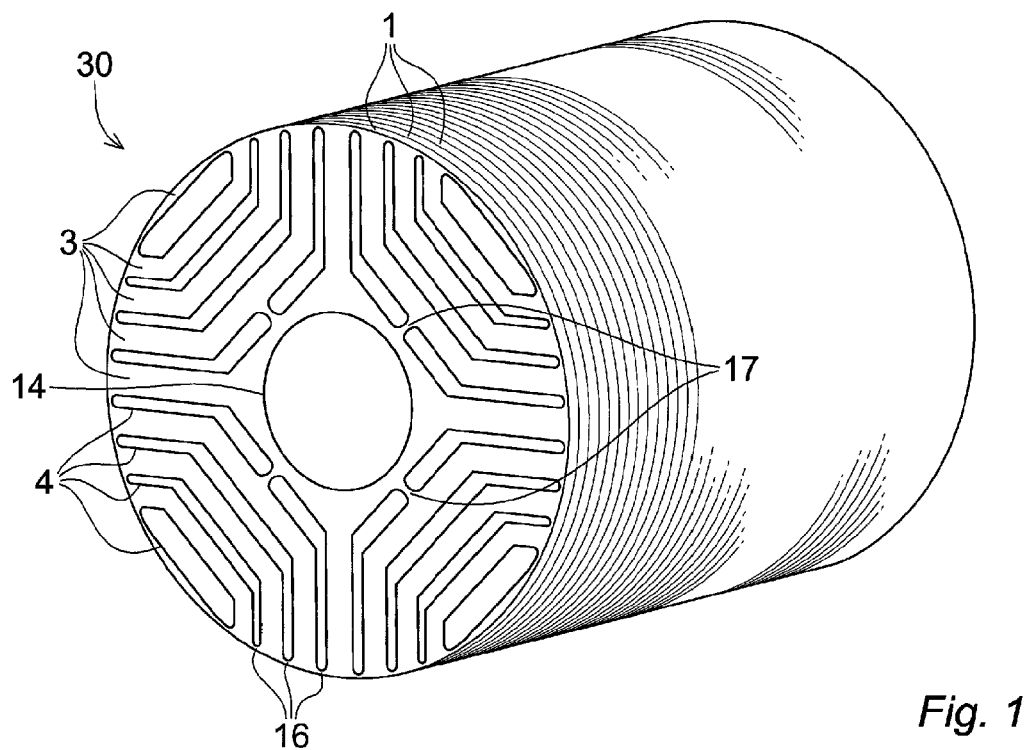
FIG. 1 shows a rotor according to one embodiment of the invention with transversally oriented rotor discs.

FIG. 1 shows a rotor 30 according to one embodiment of the invention, the rotor 30 essentially consisting of a stack of thin rotor discs 1.

Figure 2:
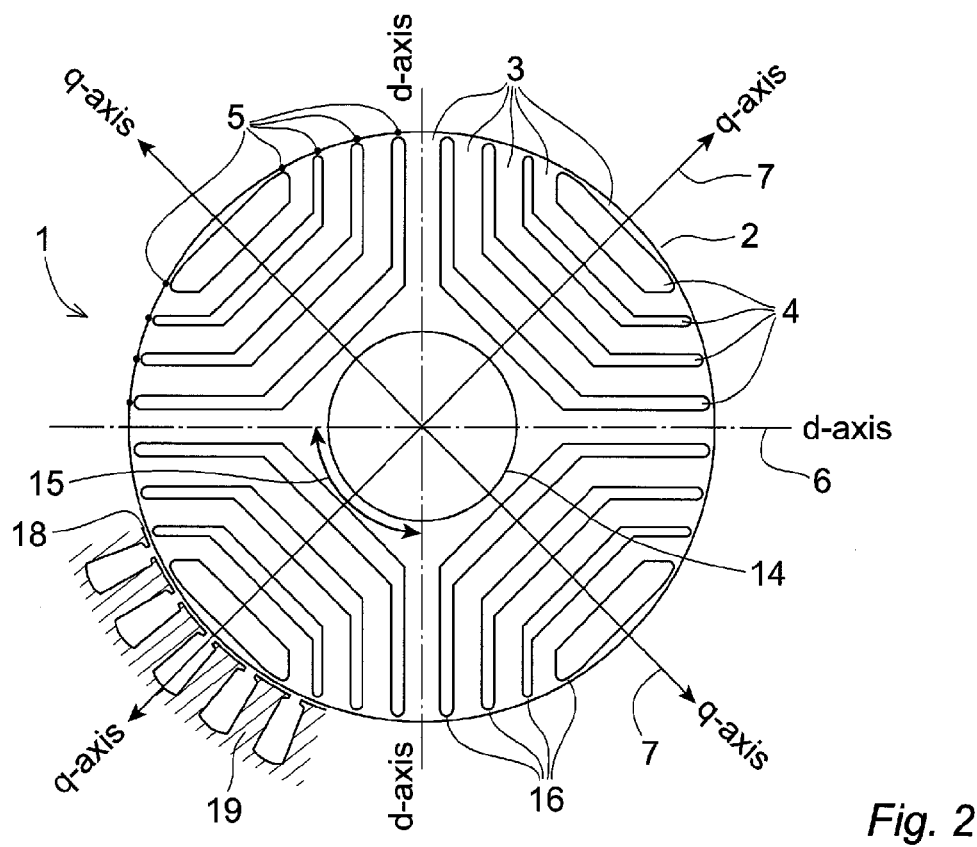
FIG. 2 shows a rotor disc without cut-offs.

FIG. 2 shows a rotor disc 1 for a rotor 30 according to one embodiment of the invention. The depicted rotor disc 1 comprises four pole sectors 15, each pole sector 15 comprising five segments 3 made of a material with a high relative magnetic permeability. Each of the five magnetically permeable segments 3 has an arm-shaped form extending between two predetermined angular positions on the disc perimeter 2. Four insulating barriers 4 are intermittently disposed between the permeable segments 3 in a manner where an alternating pattern of magnetically permeable segments 3 and insulating barriers 4 are formed along the q-axes 7 of the rotor disc 1 from a central aperture 14 towards the disc perimeter 2. The insulating barriers 4 are separated from the air gap 18 between the rotor 30 and the stator 19 by tangential ribs 16. Optionally the tangential ribs 16 can be left out if the mechanical structure of the rotor disc 1 is ensured by other means. The rotor disc 1 is formed as a single unitary element fabricated by punching or stamping a metallic carrier. The metallic carrier comprises ferromagnetic metal or alloy with a high relative magnetic permeability. The central aperture 14 is shaped to mate to a rotor shaft.

The insulating barriers 4 are extending between two pitch points 5 at the perimeter 2 of the rotor disc 1. The positions of the pitch points 5 have to be accurately defined as they have a great significance for a resulting torque ripple. Since the insulating barriers 4 may get many different shapes and the end portions of the cut-outs often have a rounded shape, it is not always obvious which point exactly should be considered as the pitch point 5. For the purpose of disclosure, the following definitions are made for the pitch points 5: A pitch point 5 is a point on the perimeter 2 of the rotor disc 1. In cases where the insulating barrier 4 reaches an air gap 18 between the rotor disc 1 and a surrounding stator 19, the pitch point 5 should be considered to lie in the middle of the opening separating two neighbouring magnetically permeable segments 3. In cases where the insulating barriers 4 are separated from the air gap 18 by tangential ribs 16, the pitch point 5 should be considered to lie on the imaginary continuation of the middle axis of the insulating barrier 4 taking account the overall shape of all the insulating barriers 4. This is often the narrowest point of the tangential ribs 16, but it does not need to be. However, the pitch point 5 is in this case a point on the tangential rib 16, and often this coincides with the narrowest point of the tangential rib 16. In case of a cut-off type of rotor disc 1 with an insulating barrier 4 as the outermost radial portion on the q-axis 7, the outermost insulating barrier 4 is considered not to have pitch points 5.

Figure 3:
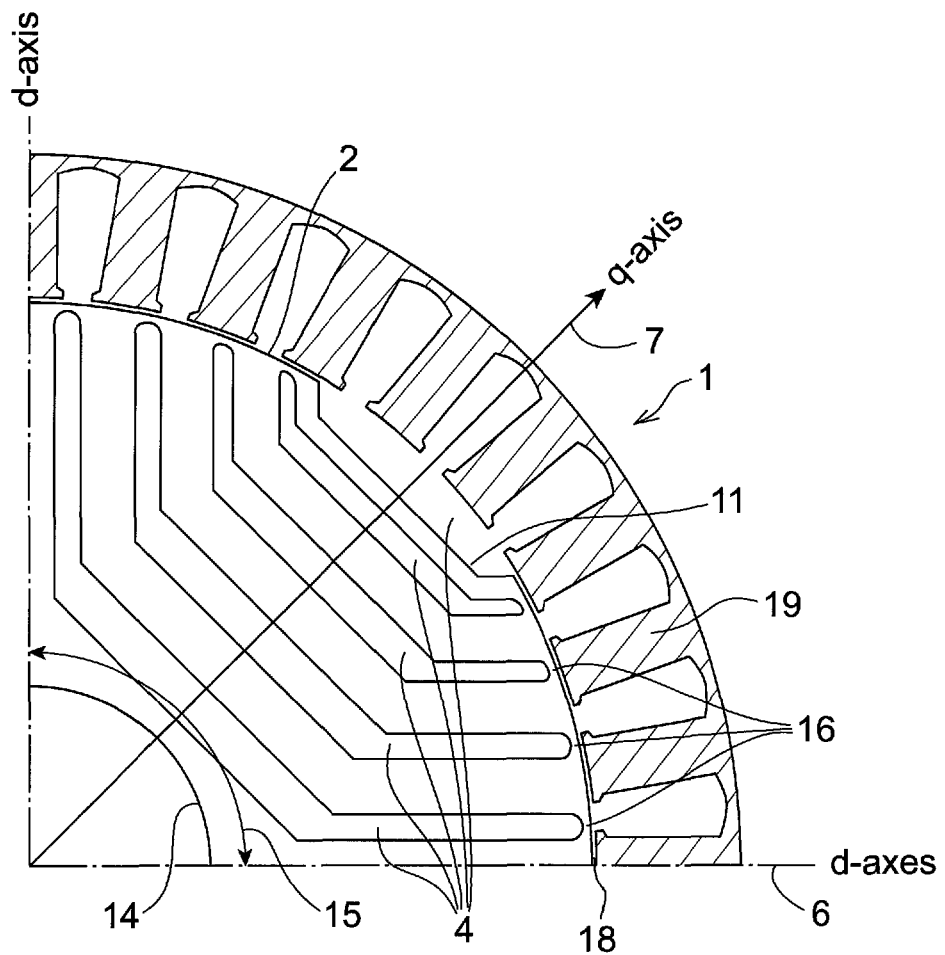
FIG. 3 shows a rotor disc with cut-offs.

Rotor discs 1 are distinguished between two different designs depending on whether the outermost radial portion on a q-axis 7 is a magnetically permeable segment 3 or an insulating barrier 4. A rotor disc 1 with a cut-off 11 refers to a rotor type shown in FIG. 3 wherein the outermost portion of the rotor pole sector 15 comprises an insulating barrier 4, e.g. air in form of a shallow recess provided in the peripheral edge of the rotor perimeter 2. The rotor disc 1 is provided with cut-offs 11 in order to disable the magnetic flux at the outermost radial portions on the q-axes 7. Conversely, a rotor disc 1 without a cut-off 11 refers to a rotor type shown in FIG. 2 wherein the outermost portion of the rotor pole sector 15 consists of a magnetically permeable segment 3 forming a substantially smooth semi-circular perimeter 2.

Figure 4:
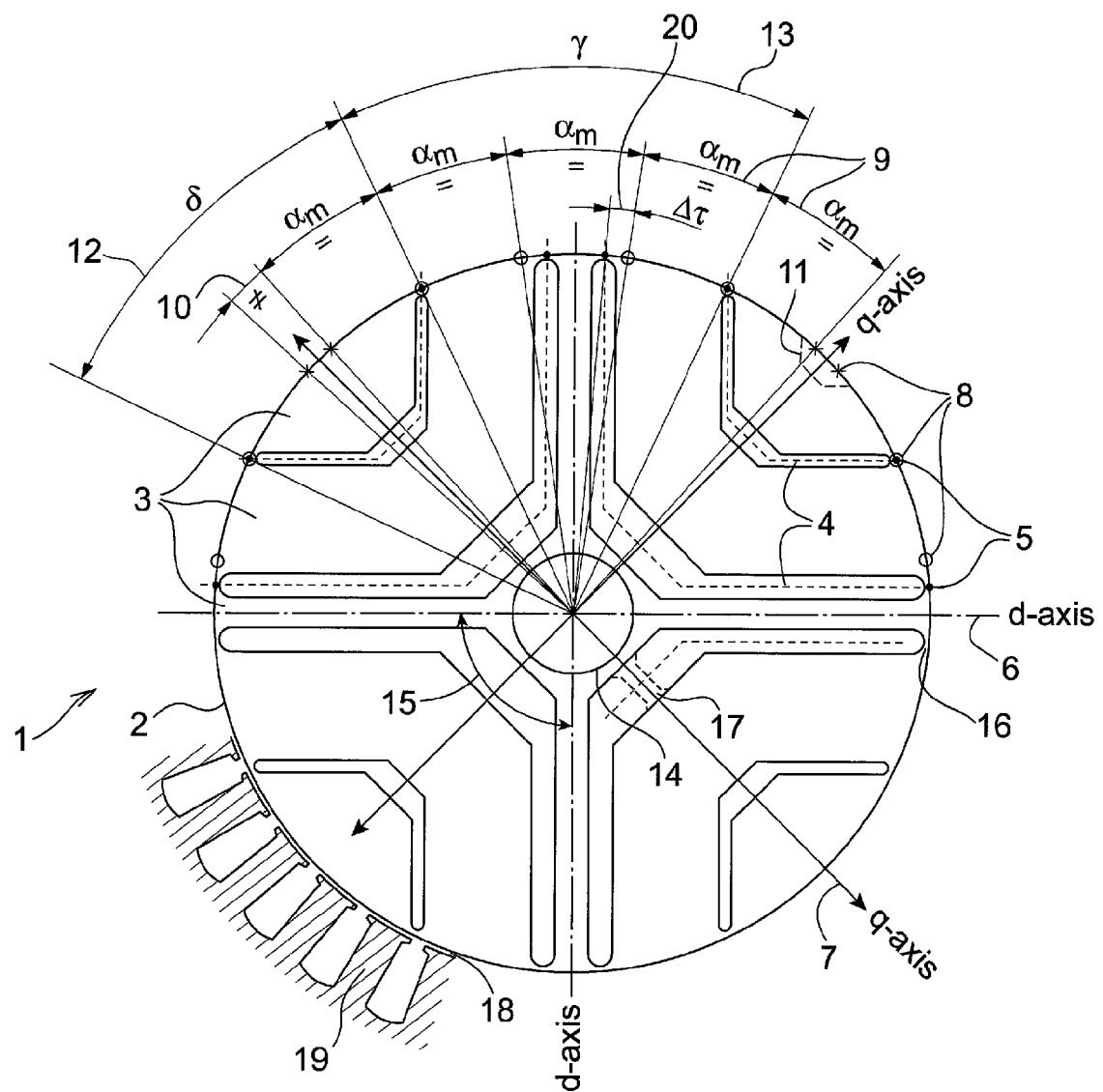
FIG. 4 shows a rotor disc with the definition of reference points and reference angles illustrated.

Since the invention is based on modifications in the insulating barrier geometry which may not be immediately apparent without doing some measurements, we here define some auxiliary reference points 8 which are useful for explaining the invention and for making the modifications readily measurable. FIG. 4 is a schematic drawing showing the definitions of the reference points 8 and reference angles 9, 10 related to the reference points 8. The number of insulating barriers 4 has been chosen to be small (two) for the clarity of the drawing, but any suitable number of barriers can be chosen. The reference points 8 are located on the perimeter 2 of the rotor disc 1 symmetrically with regard the q-axes 7. The angular intervals between the reference points 8 define reference angles 9, 10 which between two neighbouring q-axes 7 have an equal value $\alpha_m$. The value $\alpha_m$ is defined by taking the average of the angular distances of the pitch points 5 between two neighbouring q-axes 7, i.e.

$$\alpha_m = \frac{\gamma}{(k-1)} \quad (1)$$

where γ is the value of the angle 13 between two pitch points 5 that are furthest apart between two neighbouring q-axes 7, and k is the number of pitch points 5 between two neighbouring q-axes 7.

In FIG. 4 the reference points 8 are marked with circles and crosses, the circles representing real reference points 8 and the crosses representing virtual reference points 8. The real reference points 8 are related to the real pitch points 5. The virtual reference points 8 are related to pitch points of insulating barriers 4 that for mechanical or other reasons have not been realized. An insulating barrier 4 provided between the virtual reference points 8 would become very small and would have very little significance for the performance of the machine. Virtual pitch points are conventionally used to illustrate that the pitch angle is equal even across the q-axes 7 where no actual insulating barriers 4 are present. In FIG. 4 the virtual reference points 8 are used to illustrate, conversely, that the reference angles 10 across the q-axes 7 are different from the reference angles 9 between two neighbouring q-axes 7. Otherwise, the virtual reference points 8 are of no significance for the present invention.

A q-axis pitch angle 12 is defined by an angular distance between two neighbouring pitch points 5 on opposite sides of a q-axis 7, and is denoted by δ. While in a conventional rotor 30 with an equal rotor slot pitch the q-axis pitch angle 12 becomes δ=3*$\alpha_m$, according to the present embodiment δ can get an arbitrary value which can be smaller or larger than 3*$\alpha_m$. It may, however, happen that the q-axis pitch angle 12 at which the optimum torque ripple behaviour is achieved lands to a value δ=3*$\alpha_m$, but this is an exceptional condition and lies outside of the scope of the protection sought. According to a large number of conducted test cases the optimal δ value normally differs considerably from 3*$\alpha_m$. The conducted test cases are showing values for relative difference $\eta_\delta$ $$\eta_\delta = \frac{\delta - 3 \cdot \alpha_m}{3 \cdot \alpha_m} \cdot 100\% \quad (2)$$

from $\eta_\delta$=−46% to $\eta_\delta$=+117% (corresponding to δ≈1.6*$\alpha_m$ and δ≈6.5*$\alpha_m$, respectively). The q-axis pitch angle 12 does not reach the value δ=0 degrees, since this condition would correspond to removing one of the insulating barriers 4. The maximum value of δ is in theory limited to the angular width of the pole sector 15, but in practice δ must have considerably smaller value such that the insulating barriers 4 obtain reasonable widths and the machine obtains an acceptable torque. According to conducted test cases for a four pole rotor (90 degrees pole sector 15) δ values above 50 degrees are rare.

The modification of the q-axis pitch angles 12 affects the reference angles 9, 10 since the sum of δ and the angle 13 between two outermost pitch points 5 between two neighbouring q-axes 7, denoted by γ, is a constant depending on the number of rotor poles. This can be expressed as $$\delta + \gamma = \frac{2 \cdot \pi}{p} \, [\text{rad}] \quad (3)$$

where p is the number of poles of the rotor disc 1. For a four pole rotor δ+γ=π/2 rad (90 degrees), as can be readily observed from FIG. 4. By solving γ from equation (3) and substituting in the earlier established reference angle 9 definition of equation (1), we can express $\alpha_m$ as a function of δ:

$$\alpha_m = \frac{\gamma}{(k-1)} = \frac{2 \cdot \pi - p \cdot \delta}{p \cdot (k-1)} \quad (4)$$

After choosing the δ value all the insulating barriers 4 are modified accordingly to render the angular positions of the pitch points 5 to correspond to the newly defined αm. The dimensioning of the rotor disc 1 according to the present invention may comprise several iteration steps where different δ values are tested in order to find a value corresponding to a satisfactory or optimal torque ripple behaviour. The testing may be done by using a FEM and a computer simulation.

The reference points 8 represent the optimal angular positions of the pitch points 5, but small deviations 20 in the angular positions of the pitch points 5 and the corresponding reference points 8 are allowed as denoted by $\Delta_T$ in FIG. 4. Only the angular positions of the two pitch points that are furthest apart between two neighbouring q-axes 7 need to coincide with the angular positions of the corresponding reference points 8, this condition following from the definition of the reference points 8. The allowed magnitude $\Delta_T$ of the deviation 20 represents a tolerance within which a satisfactory torque ripple value is achieved. According to simulations made on a number of rotor designs in combination with stators having a various number of slots, $\Delta_T$ should have a value less than 3 degrees, preferably less than 2.5 degrees, more preferably less than 2 degrees, and most preferably less than 1 degree. In FIG. 4 the deviation 20 is exaggerated for the purpose of illustration.

The present invention should preferably be used in combination with an appropriate simulation model which may be configured to return a predetermined performance measure of the rotor disc 1, such as torque ripple, torque, ratio between torque and torque ripple or power factor. As can be understood from the earlier description, it is essential for the invention that one of the design variables of the simulation model is the q-axis pitch angle 12, but the model may comprise a desired number of other design variables as well. Simulation models may differ a lot depending on the general geometry of the rotor cross-section and the shape of the insulating barriers 4. It is assumed that a person skilled in the art is capable of creating a simulation model such as a magnetic representation of a rotor disc 1 in form of a FEM disc model in order to apply the present invention in an effective way. The FEM disc model can be created with a commercially available finite element program, for example Flux2D from CEDRAFT Group or Maxwell® supplied by Ansoft, by entering relevant data defining rotor disc geometry and dimensions, and magnetic and electrical properties of the rotor disc material.

Figure 5C:
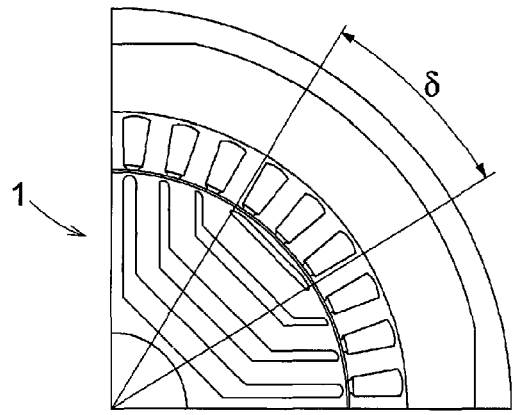
Figure 5C:
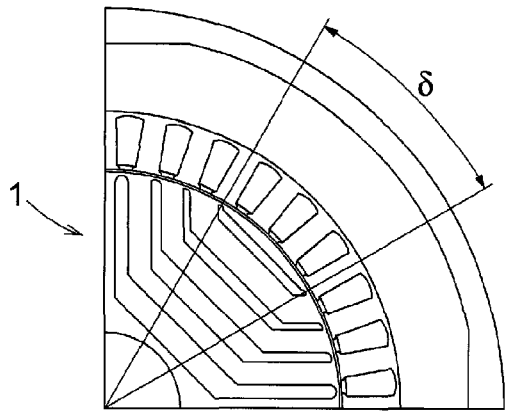
Figure 5C:
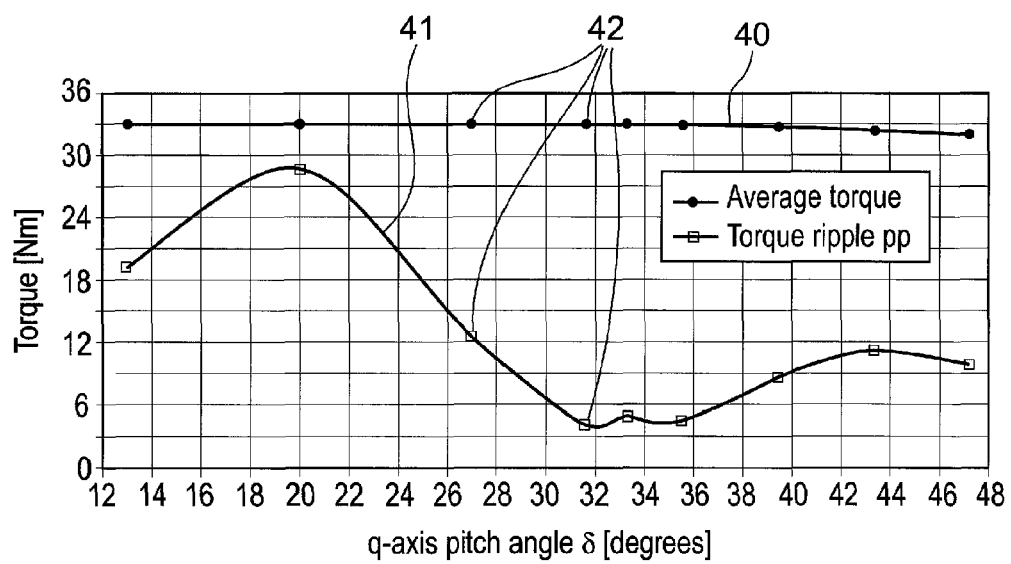

Accordingly, by introducing the new design variable δ in the rotor disc model and changing its value the resulting effect on any desired performance measure of the rotor disc 1 can be determined. For example, as illustrated in FIG. 5c), selecting the δ value between 30 and 38 degrees (corresponding to $\delta=3.5^*\alpha_m$ and $\delta=5.1^*\alpha_m$, respectively) for a four pole (p=4) and four barrier (k=8) rotor disc design leads to a considerable improvement in the torque ripple without noticeable detrimental effect on the average torque. This insight has lead the inventors to the presently disclosed δ based rotor disc modelling methodologies as a tool for optimizing predetermined performance measures of the rotor disc model.

FIG. 5c) is a graph illustrating an average rotor disc torque 40 and a peak-peak torque ripple 41 in absolute value as a function of the design variable δ for a certain rotor disc model. The unit on the y-axis is Nm (Newton meter) and the unit on the x-axis is degrees. The variable δ is stepped through the discrete set of values 42 indicated by solid dots on the torque ripple curve. The two rotor disc portions depicted in FIGS. 5a) and 2b) illustrate the effect of changing the δ value to the geometry of a rotor disc 1. FIG. 5a) represents a δ value of about 27 degrees corresponding to an equal rotor slot pitch $\delta=3^*\alpha_m$, and FIG. 5b) represents a δ value of about 31.7 degrees ($\delta\approx3.8^*\alpha_m$).

The depicted torque ripple variation in FIG. 5c) at different δ values clearly demonstrates the significant advantages obtainable by application of the present invention to rotor disc design. For the above-mentioned equal rotor slot pitch condition, torque ripple 41 was computed to about 12.6 Nm while the average torque 40 was around 33 Nm. At the local minimum of the torque ripple 41 with the δ value of around 31.7 degrees, the associated torque ripple 41 is considerably reduced to about 4.2 Nm while the average torque 40 remains essentially constant with a high value around 33 Nm.

Figure 6:
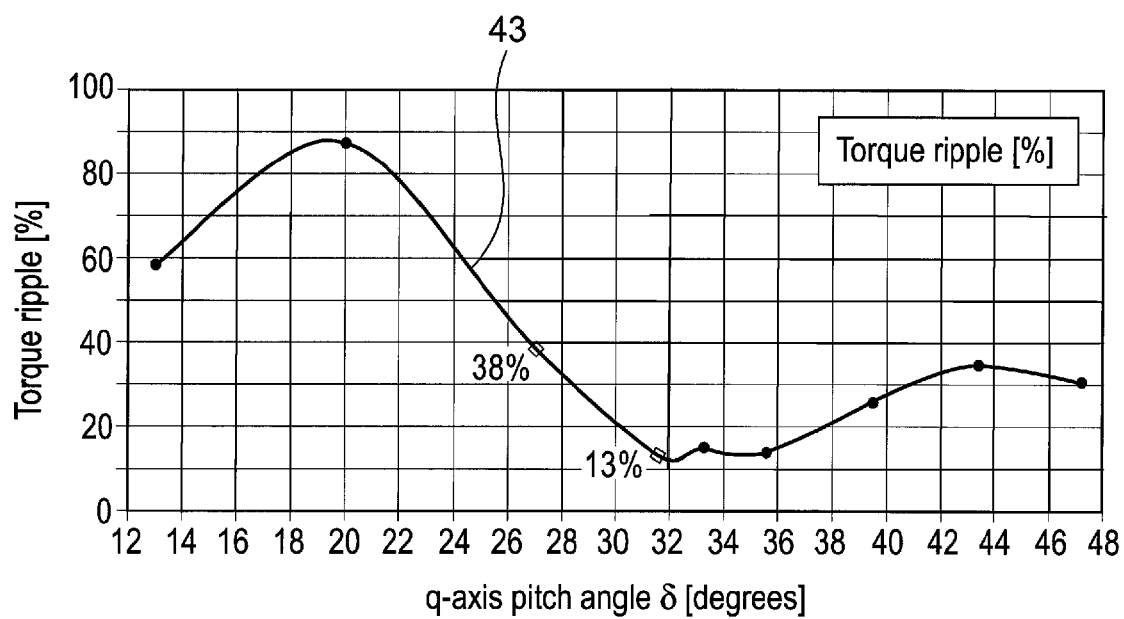
FIG. 6 shows a relative torque ripple curve corresponding to the curve of FIGS. 5a-5c.

The torque ripple curve 43 on the graph of FIG. 6 is derived from the data of FIG. 5c) by computing and displaying the peak-peak torque ripple 41 as a percentage of the average rotor disc torque 40 and mapping the percentage unit on the y-axis. This performance measure is of significant practical interest because it expresses how large a part the torque ripple 41 is of the average torque 40. The x-axis shows the δ value in degrees as is the case on FIG. 5c). Once again, the considerable improvement that can be obtained in the ratio between torque ripple 41 and average torque 40 by optimizing the δ value is demonstrated.

The invention is not limited to the embodiments described above, but the person skilled in the art may, of course, modify them in a plurality of ways within the scope of the invention as defined by the claims. Whereas in the previous disclosure reference is mostly made to rotor discs, it should be clear for the person skilled in the art that the same design principles can be applied to axially oriented laminations.

What is claimed is:

1. A rotor for a synchronous reluctance machine, a cross-section of the rotor comprising:
    four pole sectors arranged symmetrically about a central aperture of the cross-section, each pole sector comprising a plurality of insulating barriers, each insulating barrier extending between two pitch points,
    a plurality of q-axes, each q-axis defining a direction of maximum reluctance of the corresponding pole sector,
    a perimeter defining the outer contour of the cross-section,
    a plurality of reference points located on the perimeter symmetrically with regard to the q-axes, the angular intervals between the reference points defining reference angles which between two circumferentially adjacent q-axes have an equal value of $\alpha_m=\gamma/(k-1)$, where γ is an angle between two pitch points that are furthest apart between two circumferentially adjacent q-axes and k is the number of pitch points between two circumferentially adjacent q-axes,
    a q-axis pitch angle defined by an angular distance δ between two circumferentially adjacent pitch points on opposite sides of a q-axis, the q-axis pitch angle having a value which is different from $\delta=3^*\alpha_m$,
    the angular positions of each pitch point and the reference point closest to that pitch point have a deviation having a value $\Delta_T$ less than 2.5 degrees, characterized in that the q-axis pitch angle has a value δ 50 degrees or less.

2. The rotor according to claim 1, wherein the angular positions of the pitch points and the closest reference points have a deviation having a value $\Delta_T$ less than 2 degrees, such as less than 1 degree.

3. The rotor according to claim 1, wherein the q-axis pitch angles differ from $\delta=3^*\alpha_m$ by at least 1 degree, such as at least 2, 3, 5 or 10 degrees.

4. The rotor according to claim 1 comprising a radial rib across an insulating barrier for improving the mechanical strength of the rotor.

5. The rotor according to claim 1 comprising a cut-off at the rotor perimeter on a q-axis.

* * * * *